United States Patent
Frisk

[11] Patent Number: 6,117,541
[45] Date of Patent: *Sep. 12, 2000

[54] POLYOLEFIN MATERIAL INTEGRATED WITH NANOPHASE PARTICLES

[75] Inventor: Peter Frisk, Chicago, Ill.

[73] Assignee: Tetra Laval Holdings & Finance, SA, Pully, Switzerland

[*] Notice: This patent is subject to a terminal disclaimer.

[21] Appl. No.: 08/887,139

[22] Filed: Jul. 2, 1997

[51] Int. Cl.[7] .................................................. B32B 5/16
[52] U.S. Cl. ......................... 428/327; 428/328; 428/338; 428/339; 428/340; 428/407; 428/451; 428/476.3; 428/477.7; 428/483; 428/516; 428/34.7; 428/36.4
[58] Field of Search .................... 428/36.4, 327, 428/338, 339, 403, 407, 500, 501, 504, 511, 512, 447, 451, 454, 475.8, 476.3, 477.7, 483, 515, 520, 34.7, 328, 340, 516

[56] References Cited

U.S. PATENT DOCUMENTS

| | | | |
|---|---|---|---|
| 4,521,437 | 6/1985 | Storms | 426/130 |
| 4,528,235 | 7/1985 | Sacks et al. | 428/220 |
| 4,618,528 | 10/1986 | Sacks et al. | 428/216 |
| 4,728,478 | 3/1988 | Sacks et al. | 264/514 |
| 5,102,948 | 4/1992 | Deguchi et al. | 524/789 |
| 5,234,763 | 8/1993 | Rosen | 428/349 |
| 5,468,520 | 11/1995 | Williams et al. | 427/560 |
| 5,523,338 | 6/1996 | McCarthy et al. | 523/466 |

FOREIGN PATENT DOCUMENTS 9617885  6/1996  WIPO.

OTHER PUBLICATIONS

Article: "Compounding", pp. 635–654 in *SPI Plastics Engineering Handbook*. Reviewed and updated by Dr. Paul Fenelon, Comalloy International Corp. Brentwood, TN.

*Primary Examiner*—Rena L. Dye
*Attorney, Agent, or Firm*—Welsh & Katz, Ltd.

[57] ABSTRACT

A packaging laminate having an integrated polyolefin layer is disclosed wherein the polyolefin is integrated with a nanometer size particle of clay. The nanometer size particles may have a thickness of 0.9 to 100 nanometers, and an aspect ratio of 100 to 2000. The clay particles compose only 0.1 to 10 weight percent of the polyolefin layer. The integrated polyolefin layer provides substantial barrier properties to the packaging laminate. The packaging laminate may be used for a pouch, a PET bottle, a parallelepiped container, a gable top carton, a blow moulded bottle, and other applicable containers for flowable foods such as juice, milk and cheese.

2 Claims, 7 Drawing Sheets

POLYOLEFIN MATERIAL INTEGRATED WITH NANOPHASE PARTICLES

CROSS REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to high barrier material for food packaging. Specifically, the present invention relates to a polyolefin material integrated with a plurality of nanometer size particles with each of the nanometer size particles having an aspect ratio of between 50 to 2000.

2. Description of the Related Art

Developing a material which has greater impermeabilty to gases than previous materials has been the goal of the packaging industry. Greater impermeability will lead to longer shelf life, more aseptic products, and the ability to package product which previously were commercially unavailable in package form.

The packaging industry has previously produced multi-layered packaging materials consisting of at least one skeletal layer which is composed of a blend of a polymer material and an inorganic filler material. Most of these packaging materials have included the inorganic filler to increase the light-shielding and thermal insulating properties of the package, with a few including the inorganic fillers for their ability to enhance the mechanical properties of the package. In practicing such inventions, the particular size of the inorganic filler particles has not been addressed since these inventions were only seeking to capture the bulk properties of these inorganic fillers for use in their packaging. An example of such is disclosed in Rosen, U.S. Pat. No. 5,234,763, for a Packaging Material And Also Use Of The Material For The Manufacture of Containers. In Rosen, the preferred inorganic fillers are chalk, talc, lime, mica or clay with the preferred filler being chalk.

A recent trend in many fields is to blend polymer materials with particles of a modified clay mineral with very high aspect ratios. An aspect ratio is the ratio of a particular object's width to its thickness. The nanosize particles of clay usually have a width of several microns while the thickness is in the nanometers, hence the designation "nanosize particles." Much of the work in this area has focused on producing a composite material which increases the mechanical strength and heat resistance of the polymer material. One such example is Deguchi et al, U.S. Pat. No. 5,102,948, for a Polyamide Composite Material And Method For Preparing The Same. An object of Deguchi et al is to provide a polyamide composite which possesses the properties of increased mechanical strength and heat resistance, but also has an improved dye-affinity and whitening resistance. The focus of this packaging trend has been to increase the mechanical strength and heat resistance of the polymeric material. This has resulted in the industry attempting to further increase the weight percentage of inorganic material while maintaining the some aspects of the polymeric nature of the material.

The foregoing patents fail to address the need for developing a container which has a greater impermeability to the ingress and egress of gases without entirely changing the polymeric nature of the material.

BRIEF SUMMARY OF THE INVENTION

The present invention provides a packaging laminate which provides greater impermeability to a container fabricated from the laminate. The present invention accomplishes this in a manner which allows for the use of contemporary packaging machinery to fabricate a container.

The present invention is a laminate having at least one of its layers composed of a polyolefin integrated with nanometer size clay particles. The clay particles are approximately 0.1 to 10.0 weight percent of the layer. Each of the clay particles has a thickness of between 0.9 and 100 nanometers and an aspect ratio of between 100 and 2000. The polyolefin material may be any number of polyolefins with a preferred polyolefin being linear low density polyethylene. A preferred clay particle is bentonite.

For added barrier performance, a SiOx layer may be coated on the integrated polyolefin layer. Additionally, the integrated polyolefin layer may be bonded to another polymer layer, a paper layer or a cardboard layer. The packaging laminate may be fabricated into a pouch (self-supporting or flexible), a gable-top carton, a parallelepiped container, a blow-moulded bottle or a cylindrical PET bottle.

It is a primary object of the present invention to provide a packaging laminate having greater barrier performance.

Having briefly described this invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

Several features of the present invention are further described in connection with the accompanying drawings in which:

There is illustrated in FIG. 1 the polyolefin layer integrated with a plurality of nanophase particles;

Figure 2A:
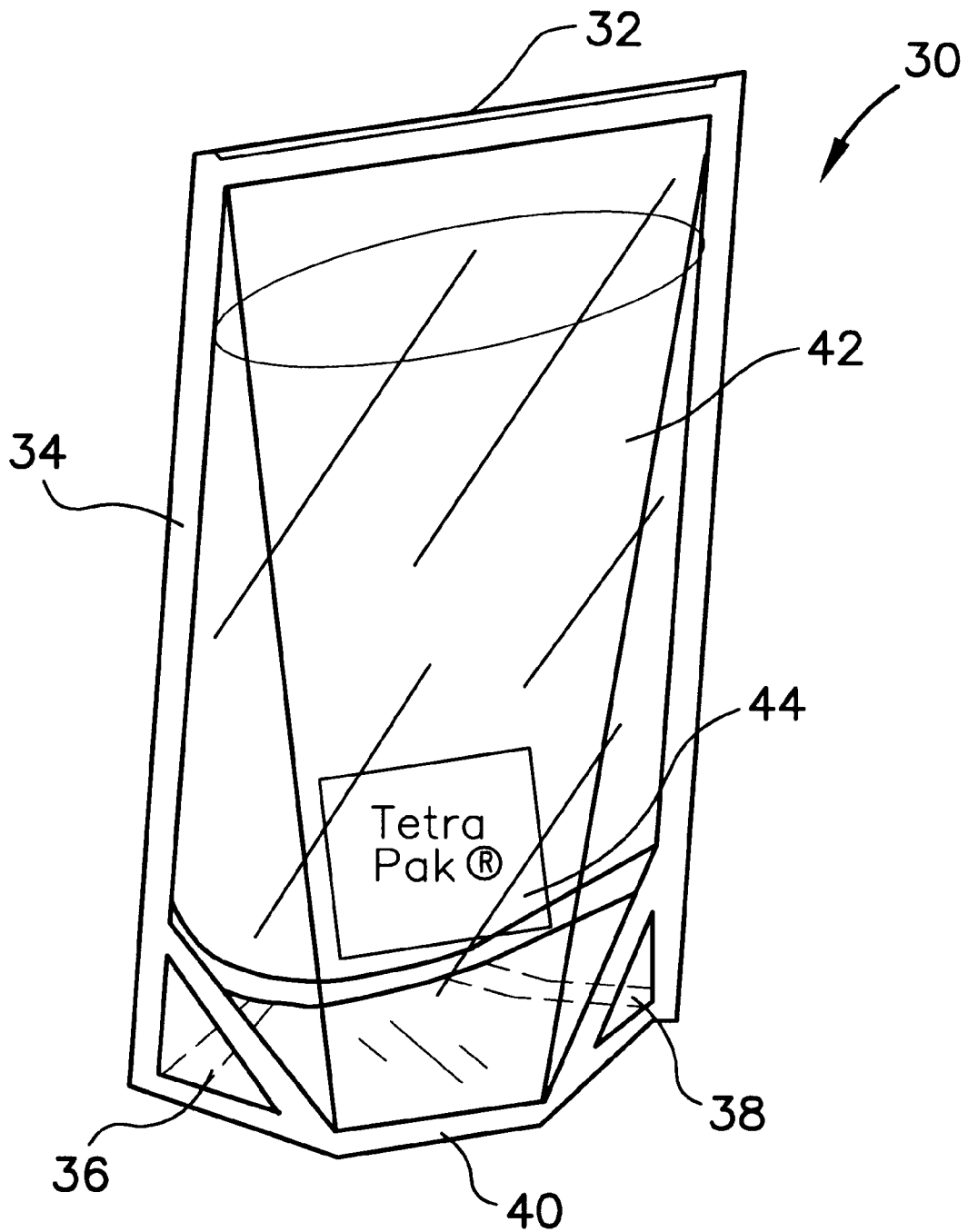

There is illustrated in FIG. 2A a perspective view of a self-supporting pouch.

Figure 2B:
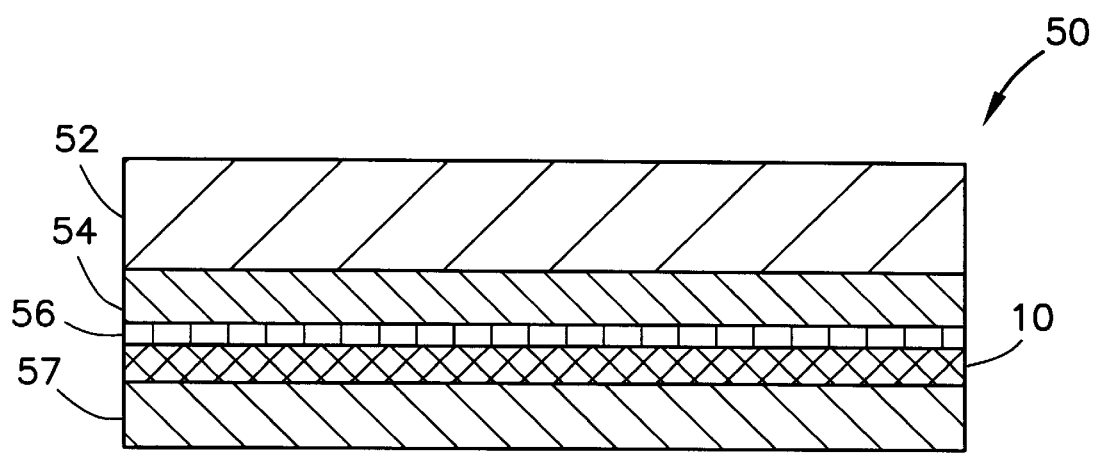
Figure 3A:
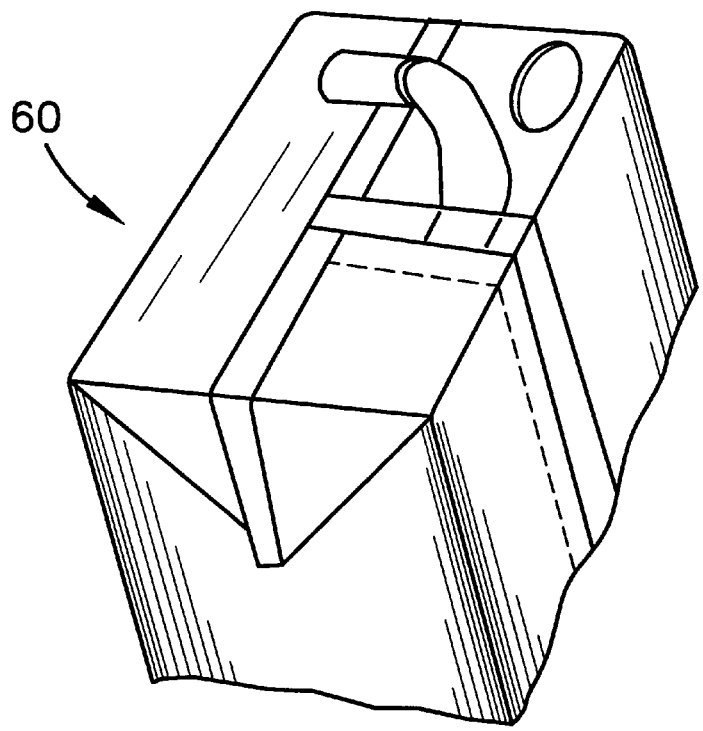

There is schematically illustrated in FIG. 2B the transverse structure of a multilayer structure of the self-supporting pouch of FIG. 2A;

There is illustrated in FIG. 3A a perspective view of a parallelepiped container.

Figure 3B:
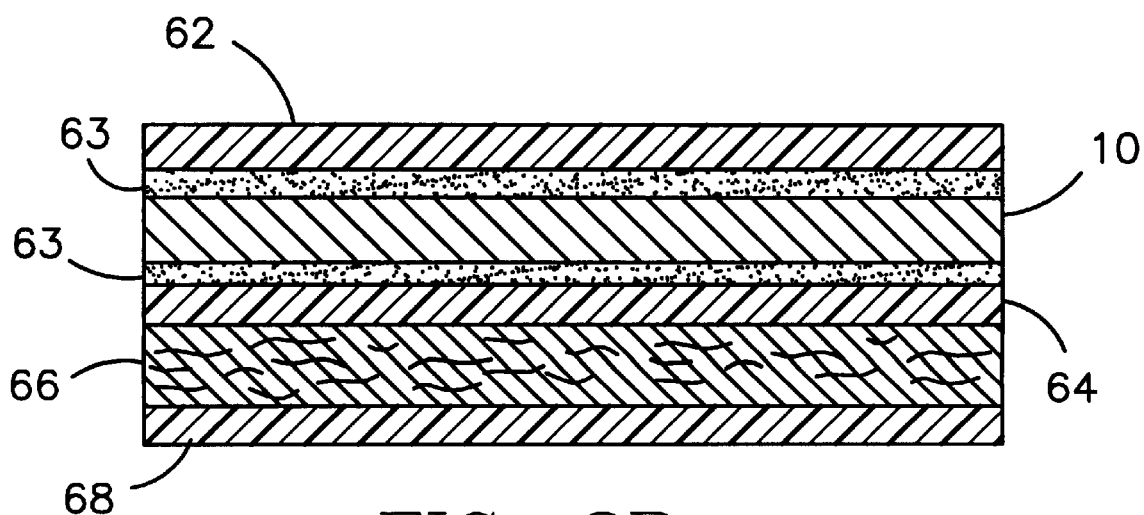

There is schematically illustrated in FIG. 3B the transverse structure of a multilayer structure of the parallelepiped container of FIG. 3A.

Figure 4A:
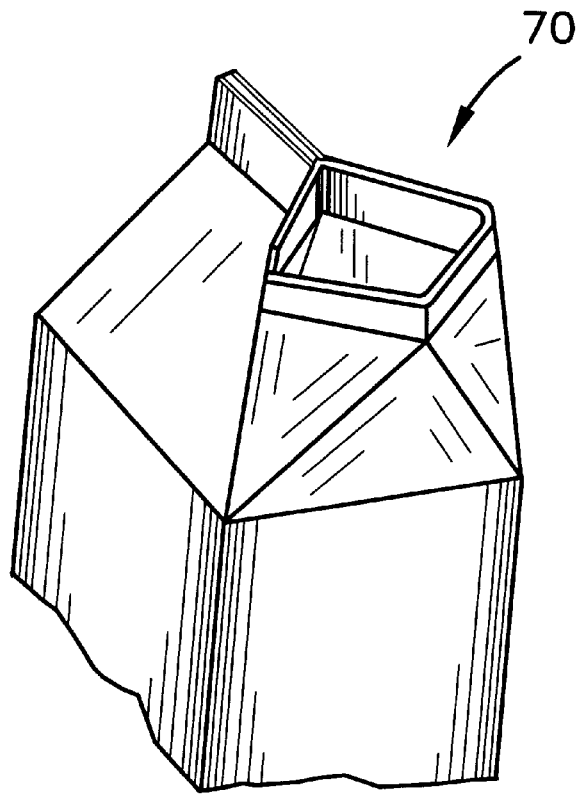

There is illustrated in FIG. 4A a perspective view of a gabletop carton.

Figure 4B:
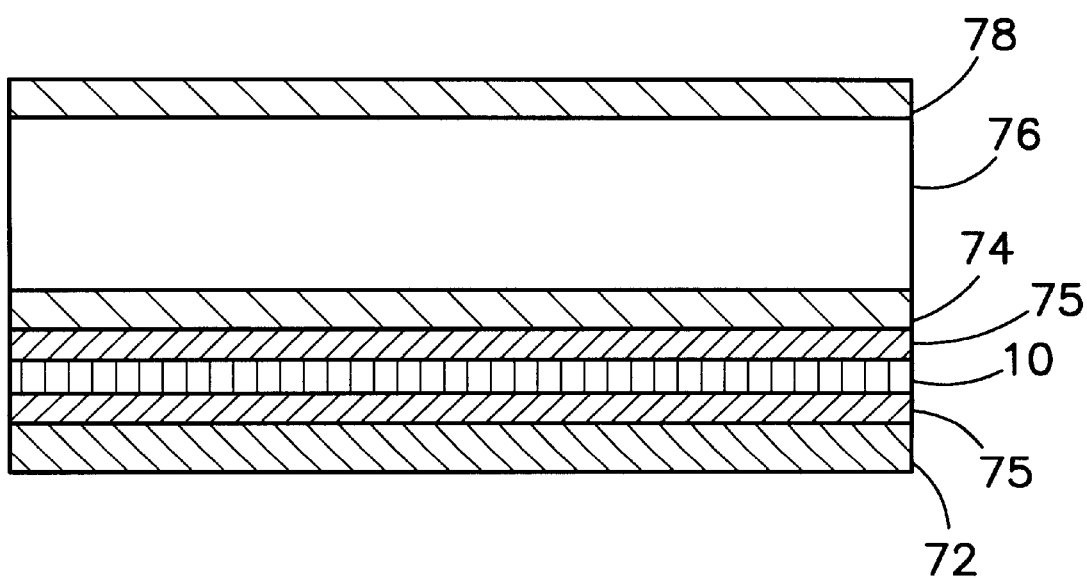
Figure 5B:
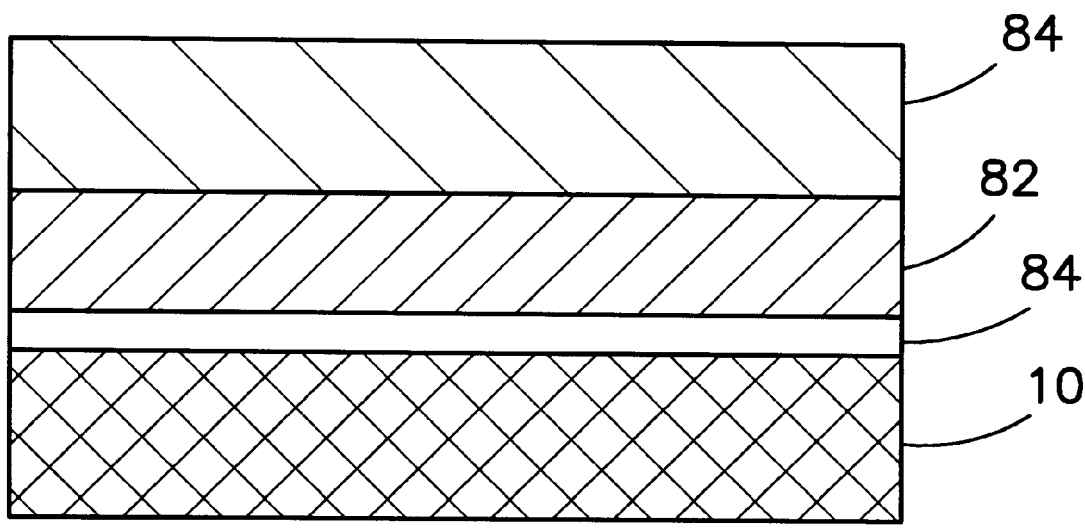
Figure 5A:
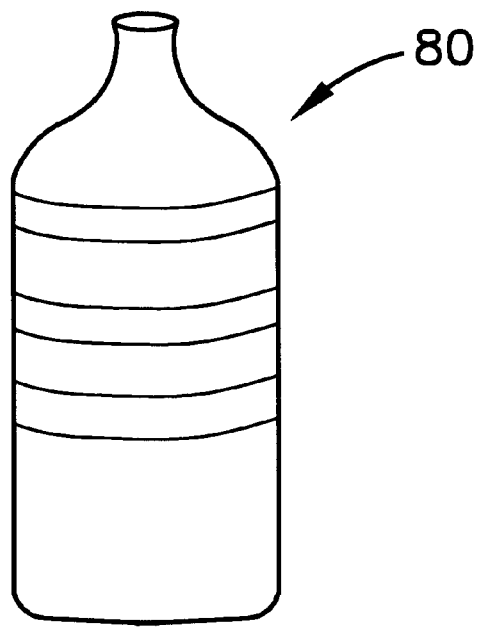

There is schematically illustrated in FIG. 4B the transverse structure of a multilayer structure of the gabletop carton of FIG. 4A;

There is illustrated in FIG. 5A a perspective view of a cylindrical PET bottle.

There is schematically illustrated in FIG. 5B the transverse structure of a multilayer structure of the PET bottle of FIG. 5A.

Figure 6A:
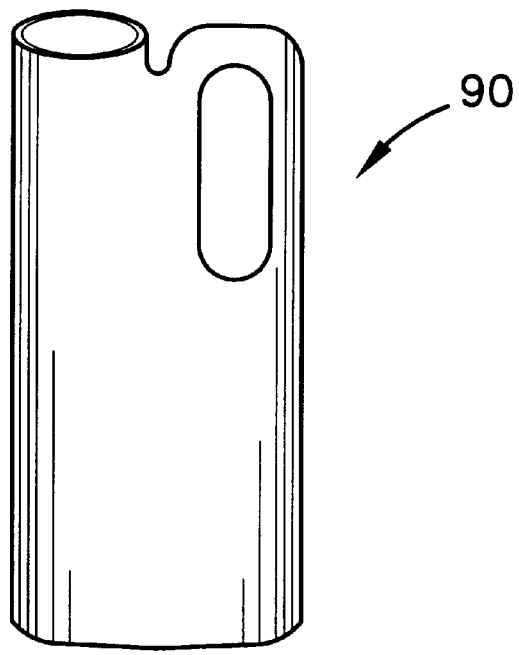

There is illustrated in FIG. 6A a perspective view of a blow-moulded bottle.

Figure 6B:
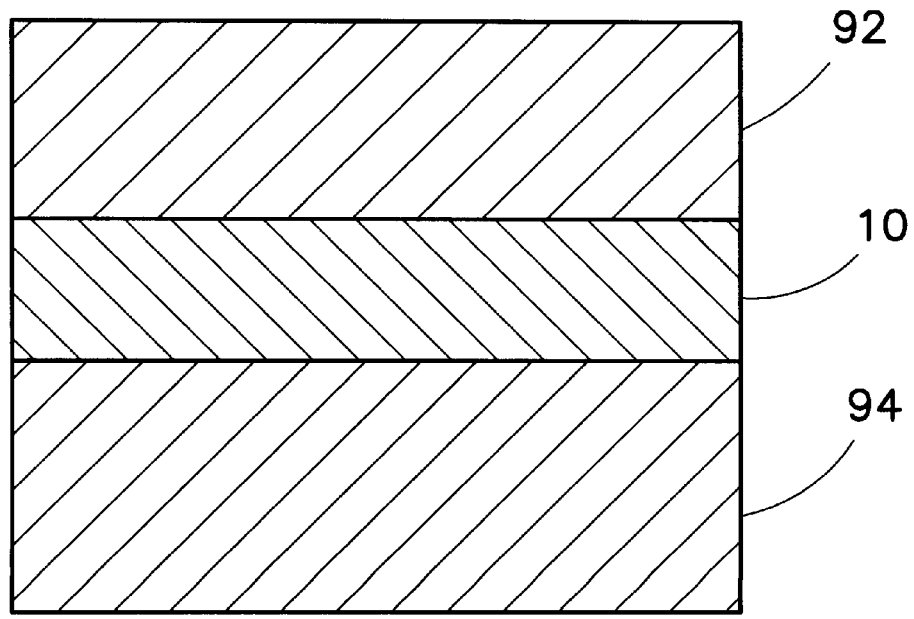

There is schematically illustrated in FIG. 6B the transverse structure of a multilayer structure of the blow-moulded bottle of FIG. 6A.

DETAILED DESCRIPTION OF THE INVENTION

Figure 1:
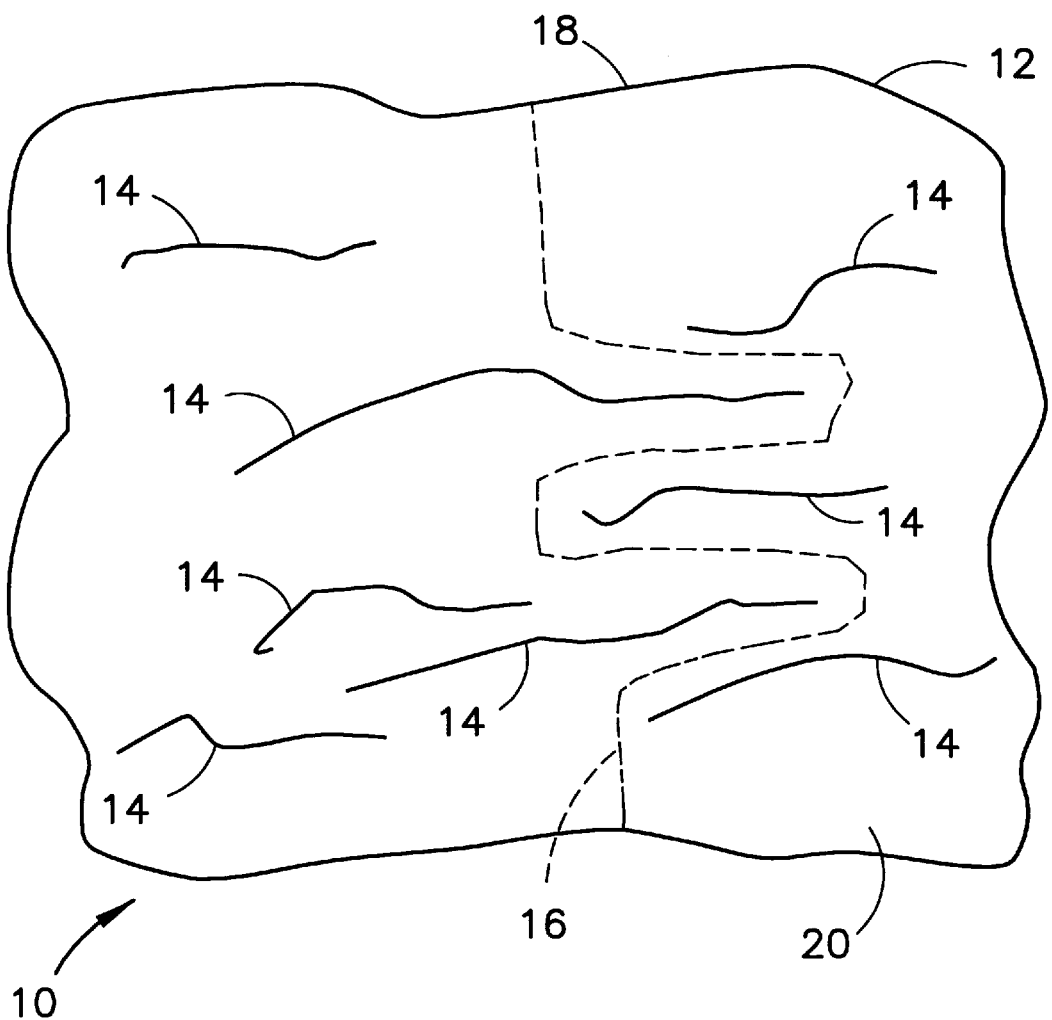

There is illustrated in FIG. 1 a distorted pathway for the ingress and egress of gases through an integrated polyolefin layer of the packaging laminate of the present invention. As shown in FIG. 1, the integrated polyolefin layer is generally designated 10 and the polymer matrix is generally designated 12. The polyolefin may be linear low density polyethylene ("LLDPE"), low density polyethylene ("LDPE"), metallocene linear low density polyethylene("mLLDPE"), high density polyethylene ("MDPE"), medium density polyethylene ("MDPE"), polypropylene ("PP"), copolymers of polypropylene, ultralow density polyethylene and mixtures thereof. The polyolefin may be slightly modified by facilitation agents for the integration of the clay particles.

The plurality of clay platelets interspersed throughout the polymer matrix 12 are generally designated 14. The clay platelets may be selected from the group consisting of smectite, vermiculite, halloysite, and any synthetic analog thereof. More specifically, the smectite clay may be selected from the group consisting of montmorillonite, saponite, beidellite, nontronite, bentonite, hectorite and mixtures thereof The clay platelets may also be modified with a surfactant.

A possible path of ingress or egress of gases through the integrated polyolefin layer is designated 16. The path 16 travels between the exterior area 18 of the integrated polyolefin layer 10 and the interior area 20 of the integrated polyolefin layer 10. If the container is a single layer container, then exterior area 18 represents the exterior of the container and interior area 20 represents the interior of the container. If the container is a multi-layer container, then exterior area 18 may be another layer of the container or the exterior of the container and interior layer 20 may be another layer of the container or the interior of the container depending on the number of layers of the container.

As is apparent from FIG. 1, any oxygen molecule which would be able to traverse the already substantially impermeable polymer matrix 12, must now circumnavigate the virtually impenetrable plurality of clay layers 14. A similar fate awaits carbon dioxide contained in the container. This distorted pathway 16 demonstrates the remarkable increase in impermeability in gases for the nanocomposite polymer container. What is equally remarkable is the aspect ratios of the plurality of clay platelets 14 which range from 50 to 2000. Although FIG. 1 fails to capture the minimal thickness of the clay platelets 14 relative to their width, the numbers provide a better perception of the astonishing properties of these clay platelets. Those numbers ranging between 9 and 1000 Angstroms for the thickness and between 1 and 5 microns for the width. Thus, the clay platelets 14 have an enormous surface area relative to their mass which accounts for their ability to enhance the properties of polymer containers. The clay platelets 14 may agglomerate to form "tactoids" which increase the thickness of the clay platelets from approximately 9 Angstroms upwards to 1000 Angstroms. As is readily apparent, the aspect ratios of the clay platelets 14 of various thickness may be equal if the corresponding widths vary to maintain a similar surface area for each of the clay platelets 14.

In addition to enhancing the barrier properties of containers, the clay platelets 14 also enhance the heat stability and mechanical properties of the container. An increased heat stability for a container is important in order to allow for "hot-filling" applications. "Hot filling" applications allow for aseptic uses of containers in the food processing industry and also extend the shelf life of various food products. The integrated clay platelets 14 also increase the stiffness of the container while not affecting the transparency of the container which is important in commercial applications. Therefore, even small weight percentages of the clay material relative to the polymer material provide substantial increases in the impermeability of the integrated polyolefin layer 10, and in the overall properties of the container.

The integrated polyolefin material may be fabricated through various methods. One such method is compounding wherein the ingredients are intimately melt-mixed together into as nearly a homogeneous mass as is possible. Using compounding, the clay particles would be melt-mixed with the polyolefin resins. A discussion of compounding is provided in the SPI PLASTICS ENGINEERNG HANDBOOK which relevant parts are hereby incorporated by reference. Other methods of integrating the polyolefm layer include in situ polymerization, solution intercalation and melt exfoliation which are described in copending U.S. patent application Ser. No. 08/677,282 filed on Jul. 9, 1996 which relevant parts are hereby incorporated by reference. Typically lamination processes may be used to fabricate the complete packaging laminate. An example of such a process is hot melt nip lamination.

As shown in FIG. 2A, a self supporting pouch 30 has a upper transverse seal 32, a longitudinal seal 34, a first oblique seal 36 and a second oblique seal 38 and a bottom seal 40. The interior 42 of the pouch 30 contains a flowable material such as a pumpable food. One particular use of the pouch 30 is for the packaging of cheese. Another use of the pouch 30 is for the packaging of fruit juices.

The pouch 30 may be transparent except for any signage 44 which may be added to indicate the contents or source of the contents. The signage 44 may be created by reverse printing on the metal deposition 24 of a laminate 50. Also, Flexo, Roto and Offset printing methods may be employed. However, those skilled in the art will recognize that other printing methods may be employed without departing from the scope or spirit of the present invention. The signage 44 may be placed at any desired position on the container 30 and may be of any size or shape. The self-supporting pouch 30 may be fabricated on a vertical form, fill and seal machine. However, those skilled in the art will recognize that the pouch 30 may be fabricated on many types of machines without departing from the scope of the present invention.

As shown in FIG. 2B, the laminate 50 is generally composed of an exterior film 52, a metal deposition 54, an adhesive 56, the integrated polyolefin layer 10 and a sealant layer 57. The laminate 50 is transparent, durable and a barrier to various gases including oxygen.

The exterior film 52 may be selected from HDPE, poly (ethylene 2,6-naphthalene dicarboxylate ("PEN"), polyamide ("PA"), PP, polyethleneterphthlate ("PET") and copolymers of polyethleneterphthlate ("COPET"). The exterior film may be unoriented, mono-oriented or biaxially oriented. The metal deposition 24 may have the formula $MO_x$ where x has a range of approximately 1.5 to approximately 2.5. M may be silicon, aluminum or iron, with a preference for silicon. The metal oxide may also be $Al_ySiO_x$, $Mg_zAl_ySiO_x$ with x having a range of 1.1 to 6.0, y having a range of 1.0 to 2.0 and z having a range of 1.0 to 2.0. The sealant layer 57 may be a polyethylene.

Various adhesives are suitable as the adhesive layer 56 for joining the integrated polyolefin layer 10 to the exterior film 52 and metal deposition 54. For example, a solvent-based adhesive available from Novacote and a solvent free adhesive from Novacote may be used in the present invention. A modified ethylene copolymer or a polyurethane adhesive may be used for this purpose. One polyurethane adhesive suitable for such use is sold by Novacote International of Hamburg, Germany. A modified ethylene copolymer is BYNEL CXA sold by DuPont.

The exterior film 52 may have a thickness range of approximately 8 to 20 microns. The integrated polyolefin layer 10 may have a thickness of approximately 25 to 150 microns. The metal oxide deposition 54 may have a thickness range of approximately 5 to 500 nanometers. The stoichiometry of the metal oxide is important to maintain the transparency and barrier properties of the multilayer structure 50. In the formula $MO_x$ where M is either aluminum, silicon or iron, and x is between 1.8 and 2.5, the ability to deposit the metal oxide within this stoichiometric range prevents the multilayer structure from becoming tinged thereby loosing its transparency. For example, when M is silicon and x is near 1.0, the multilayer structure will have a yellow tinge indicative of silicon oxide, a semiconductor which has a relatively narrow electron band gap between a filled valence band and an empty conduction band thereby allowing for the absorption of light. Whereas when M is silicon and x is near 2, the metal deposition is silicon dioxide, an insulator which has a relatively large electron band gap between a filled valence band and an empty conduction band thereby allowing for the transmission of light. Thus, it is very important that the deposition of the metal oxide be performed in a manner that will ensure this stoichiometric range in order to have the transparency as well as the expected barrier properties.

The metal oxide deposition 54 may be deposited on the exterior film 52 through a number of deposition methods. These methods include plasma-enhanced chemical vapor deposition, metalorganic chemical vapor deposition, halide transport chemical vapor deposition, liquid atmospheric photo chemical deposition, electron beam evaporation, pulsed laser ablation, atomic layer epitaxy, ion implantation, molecular beam epitaxy and RF magnetron sputtering. A preferred deposition method is plasma enhanced chemical vapor deposition described in Fayet et al, U.S. Pat. No. 5,531,060 which is hereby incorporated by reference. However, it will be apparent to those skilled in the pertinent art that other deposition methods may be employed while not departing from the scope of the present invention.

Referring still to FIG. 2B, a preferred embodiment of the laminate 50 may have the exterior film 52 composed of a biaxially oriented PET with a silicon oxide deposition 54 having the following stoichiometry, $SiO_x$, where x has value between 1.5 and 2.5. In this preferred embodiment, the integrated polyolefin layer 10 is composed of a blend of LLDPE and LDPE, and is integrated with particles of smectite clay. The sealant layer 57 may be a LLDPE.

Alternatively, the metal oxide deposition may be coated on the integrated polyolefin layer 10. The same deposition/coating methods as mentioned above may be used to place the metal oxide layer on the integrated polyolefin 10. There is no need for the exterior layer in this alternative embodiment.

FIG. 3A illustrates another container which may utilize the packaging laminate of the present invention. As shown in FIG. 3A, a parallelepiped container such as the TETRA BRIK® is generally designated 60. The transverse structure of the parallelepiped container 60 is shown in FIG. 3B. The integrated polyolefin layer 10 is bounded by thermoplastic layers 62 and 64 which are bond to the integrated polyolefin layer 10 by an appropriate adhesive 63. Layer 66 may be composed of paper or cardboard for providing stiffness to the parallelepiped container 60. Layer is 68 is composed of a similar thermoplastic material as layers 62 and 64. A preferred thermoplastic material is polyethylene. In this embodiment, the integrated polyolefin layer 10 may have a thickness of up to 20 microns while layer 66 has a thickness range of 100 to 300 microns.

A gable top carton generally designated 70 is shown in FIG. 4A. Such a carton 70 is fabricated on TETRA REX packaging machines available from TETRA REX PACKAGING SYSTEMS, INC. of Buffalo Grove, Ill., USA. The transverse structure of the carton 70 is illustrated in FIG. 4B. The integrated polyolefin layer 10 is bounded by thermoplastic layers 72 and 74 which are bond to the integrated polyolefin layer 10 by an appropriate adhesive 75. Base layer 76 may be composed of paper or cardboard for providing stiffness to the gable top carton 70. Layer is 78 is composed of a similar thermoplastic material as layers 72 and 74. A preferred thermoplastic material is polyethylene. In this embodiment, the integrated polyolefin layer 10 may have a thickness of up to 20 microns while base layer 76 has a thickness range of approximately 1 millimeter.

As shown in FIG. 5A, a cylindrical bottle is generally designated 80. The transverse structure of the bottle 80 is illustrated in FIG. 5B. As shown in FIG. 5B, the integrated polyolefin layer 10 is bonded to a metal oxide coating 82 by an adhesive 84. The metal oxide coating 82 is applied to a base layer 84. The base layer 84 may be PET or PA and may be unoriented or oriented. The base layer 84 is in contact with the interior, and contents of the bottle 80. As is apparent from all of the applications of the packaging laminate of the present invention, the integrated polyolefin layer 10 is not placed in direct contact with the product in the container. It should also be appreciated that the term packaging laminate should be given its broadest possible interpretation, and in the context of the present invention should be defined as almost synonymous with multilayer structure.

As shown in FIG. 6A, a blow moulded bottle is generally designated 90. The transverse structure of the bottle 90 is illustrated in FIG. 6B. An inner layer 92 is usually composed of HDPE, however, other comparable materials may be used. Bonded to the inner layer 92 is the integrated polyolefin layer 10 which is also bonded to an outer layer 94. The outer layer 94 may be similar to inner layer 92. The packaging laminate may be blow moulded into the bottle 90 illustrated in FIG. 6A using contemporary blow moulding machinery.

The packaging laminate may be utilized for the packaging of a flowable food product which may be a liquid such as water, milk or juice, or a flowable "solid" such as cheese or spices. However, those skilled in the art will realize that the packaging laminate of the present invention may utilized for other flowable food products without departing from the scope or spirit of the present invention.

The present invention will be described in the following examples which will further demonstrated the efficacy of the novel packaging laminate, however, the scope of the present invention is not to be limited by these examples.

EXAMPLE ONE

The integrated polyolefin layer 10 was prepared through compounding using a double-screw extruder, model ZE40/ 40 from Purfurst. The extruder has a diameter of 40/40 mm and a length on mixing zone of approximately 300 mm. The total length is proximately 900 mm. The feeding into the hopper was with a COLORFEED and nting was with a vacuum. The output for the extruder is 100 kg/hr, however, the output was lowered to 20 to 30 kg/hr for the integration of the polyolefin layer in this meltblend. The meltblend was produced into a film using a HAAKE lab-extruder, RHEO-CORD 90 with a flatdie. The meltblends are listed in Table One.

TABLE ONE

| Polyolefin Resin | Clay Particle | Weight % |
| --- | --- | --- |
| 1 BOREALIS HDPE | SCPX 1338 | 8 |
| 2 BOREALIS HDPE | SCPX 1339 | 8 |
| 3 BOREALIS HDPE | SCPX 1340 | 8 |
| 4 BOREALIS HDPE | SCPX 1341 | 8 |
| 5 EXXON LDPE | SCPX 1338 | 8 |
| 6 EXXON LDPE | SCPX 1339 | 8 |
| 7 EXXON LDPE | SCPX 1340 | 8 |
| 8 EXXON LDPE | SCPX 1341 | 8 |

The SCPX clays are designations for a montromillinoite clay which is available SOUTHERN CLAYS of Gonzales, Tex., USA. Dryblends were prepared for all of the variants (1–8), 6 kg each. The test started with pure HDPE from Borealis and purged with HDPE in between variants using HDPE. Before a LDPE polyolefin was utilized, the extruder was purged with pure LDPE and also between each variant of LDPE. The settings on the machine for HDPE variants on set forth in Table Two and those for the LDPE variants are set forth in Table Three. All temperatures are in degrees Celsius.

TABLE TWO

| | 1 | | 2 | | 3 | | 4 | |
| --- | --- | --- | --- | --- | --- | --- | --- | --- |
| Setting | Set | Actual | Set | Actual | Set | Actual | Set | Actual |
| Feedscrew | 250 | | 250 | | 250 | | 250 | |
| Screw Motor | 259 | | 259 | | 259 | | 259 | |
| Pressure Bar | 150 | | 149 | | 157 | | 157 | |
| Extruder Temp. | | | | | | | | |
| Zone 1 | 41 | 37 | 41 | 41 | 41 | | | |
| Zone 2 | 190 | 183 | 180 | 178 | 180 | 170 | 180 | 180 |
| Zone 3 | 200 | 201 | 180 | 187 | 180 | 181 | 180 | 181 |
| Zone 4 | 200 | 206 | 180 | 199 | 180 | 174 | 180 | 180 |
| Zone 5 | 200 | 204 | 180 | 194 | 180 | 175 | 180 | 175 |
| Zone 6 | 200 | 202 | 180 | 189 | 180 | 181 | 180 | 182 |
| Zone 7 | 200 | 215 | 180 | 199 | 180 | 184 | 180 | 182 |
| Zone 8 | 200 | 202 | 180 | 184 | 180 | 179 | 180 | 180 |
| Melt Temp. | | | | | | | 194 | 192 |
| Cooling Water | 25 | | 25 | | 25 | | 25 | |
| Take Off/Pelletizer | | 1,2 | | 1,2 | | 1,2 | | 1,2 |

TABLE THREE

| Setting | 5 Set | 5 Actual | 6 Set | 6 Actual | 7 Set | 7 Actual | 8 Set | 8 Actual |
|---|---|---|---|---|---|---|---|---|
| Feedscrew | 250 | | 250 | | 250 | | 250 | |
| Screw Motor | 342 | | 342 | | 342 | | 342 | |
| Pressure Bar | 50 | | 47 | | 47 | | 47 | |
| Extruder Temp. | | | | | | | | |
| Zone 1 | 41 | 37 | 41 | 41 | 41 | | | |
| Zone 2 | 160 | 158 | 146 | | 161 | 156 | | |
| Zone 3 | 160 | 158 | 161 | | 162 | 162 | | |
| Zone 4 | 160 | 167 | 165 | | 162 | 160 | | |
| Zone 5 | 160 | 169 | 168 | | 166 | 164 | | |
| Zone 6 | 170 | 179 | 179 | | 179 | 179 | | |
| Zone 7 | 150 | 168 | 167 | | 170 | 167 | | |
| Zone 8 | 160 | 161 | | 160 | 160 | | | |
| Melt Temp. | | 155 | | 159 | | 160 | | 160 |
| Cooling Water | 25 | | 25 | | 25 | | 25 | |
| Take Off/Pelletizer | | 1,2 | | 1,2 | | 1,2 | | 1,2 |

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims:

I claim as my invention:

1. A packaging laminate for a container for flowable food product, the packaging laminate comprising:

at least one layer of a polyolefin material selected from the group consisting of linear low density polyethylene, low density polyethylene, high density polyethylene, medium density polyethylene and mixtures thereof, the polyolefin material integrated with a plurality of smectite particles in the amount of 0.1 to 10 weight percent of the at least one layer, each of the smectite particles having a thickness of between 9 and 1000 Angstroms, a width of between 1 to 5 microns, and having an aspect ratio of between 100 and 555, the at least one layer having a thickness of between 0.1 to 100 microns;

a polyethylene layer bonded to a first surface of the at least one layer; and a second layer bonded to the at least one layer of the polyolefin material at a second side thereof, the second layer havinh a $SiO_x$ coating thereon, where x is in the range of 1.8 to 2.5, the second layer composed of a material selected from the group consisting of PET, COPET, polyamides or mixtures thereof.

2. The packaging laminate according to claim 1 wherein the smectite particles are selected from the group consisting of montmorillonite, bentonite, saponite, beidellite, nontronite, hectorite and mixtures thereof.

* * * * *